US009096199B2

(12) United States Patent
Yopp (10) Patent No.: US 9,096,199 B2
(45) Date of Patent: Aug. 4, 2015

(54) MONITORING AUTONOMOUS VEHICLE BRAKING

(71) Applicant: Ford Global Technologies, LLC, Dearborn, MI (US)

(72) Inventor: Wilford Trent Yopp, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 14/049,618

(22) Filed: Oct. 9, 2013

(65) Prior Publication Data

US 2015/0100190 A1 Apr. 9, 2015

(51) Int. Cl.
| | |
|---|---|
| *G01C 22/00* | (2006.01) |
| *B60T 8/172* | (2006.01) |
| *B60T 7/12* | (2006.01) |
| *B60T 7/18* | (2006.01) |
| *B60T 7/22* | (2006.01) |

(52) U.S. Cl.
CPC . *B60T 8/172* (2013.01); *B60T 7/12* (2013.01); *B60T 7/18* (2013.01); *B60T 7/22* (2013.01); *B60T 2201/022* (2013.01); *B60T 2201/03* (2013.01)

(58) Field of Classification Search
None
See application file for complete search history.

(56) References Cited

U.S. PATENT DOCUMENTS

| | | | | |
|---|---|---|---|---|
| 5,528,888 | A * | 6/1996 | Miyamoto et al. | 56/10.2 F |
| 5,719,769 | A * | 2/1998 | Brugger et al. | 701/70 |
| 5,906,645 | A | 5/1999 | Kagawa et al. | |
| 6,359,553 | B1 | 3/2002 | Kopischke | |
| 8,112,191 | B2 * | 2/2012 | Kumar et al. | 701/22 |
| 8,146,703 | B2 * | 4/2012 | Baumann et al. | 180/275 |
| 8,295,998 | B2 * | 10/2012 | Goodermuth et al. | 701/19 |
| 8,849,494 | B1 * | 9/2014 | Herbach et al. | 701/24 |
| 2007/0075875 | A1 * | 4/2007 | Danz et al. | 340/932.2 |
| 2009/0070039 | A1 * | 3/2009 | Beuschel et al. | 701/301 |
| 2009/0174573 | A1 * | 7/2009 | Smith | 340/905 |
| 2010/0030421 | A1 * | 2/2010 | Yoshimura et al. | 701/29 |
| 2010/0082195 | A1 * | 4/2010 | Lee et al. | 701/25 |
| 2010/0094520 | A1 * | 4/2010 | Zagorski | 701/70 |
| 2010/0302069 | A1 * | 12/2010 | Frank et al. | 340/932.2 |
| 2011/0025548 | A1 * | 2/2011 | Nickolaou | 342/52 |
| 2011/0040467 | A1 * | 2/2011 | Breuer | 701/96 |
| 2011/0109448 | A1 | 5/2011 | Browne et al. | |
| 2012/0095660 | A1 * | 4/2012 | Breuer et al. | 701/70 |
| 2012/0166058 | A1 * | 6/2012 | Armbrust | 701/96 |
| 2012/0323406 | A1 * | 12/2012 | Yamashiro | 701/2 |
| 2013/0110368 | A1 * | 5/2013 | Zagorski | 701/70 |
| 2013/0171590 | A1 * | 7/2013 | Kumar | 434/62 |

(Continued)

FOREIGN PATENT DOCUMENTS

KR 20010066548 A 7/2001

OTHER PUBLICATIONS

Zenlea et al., "The Autonomous Evolution", Aug. 2012 issue of Automobile Magazine, 6 pages.

*Primary Examiner* — Calvin Cheung
(74) *Attorney, Agent, or Firm* — Frank A. MacKenzie; Bejin Bieneman PLC (57) ABSTRACT

Instructions are provided to a vehicle braking mechanism for autonomous operation of the braking mechanism. At least one first parameter is retrieved for governing control of the braking mechanism. The first parameter is applied to operation of the braking mechanism. Data is collected relating to operation of the vehicle. At least one second parameter is determined for governing control of the braking mechanism.

28 Claims, 5 Drawing Sheets

(56) References Cited

U.S. PATENT DOCUMENTS

| | | | |
|---|---|---|---|
| 2013/0184926 A1* | 7/2013 | Spero et al. | 701/26 |
| 2013/0231829 A1* | 9/2013 | Gerdt | 701/41 |
| 2013/0325202 A1* | 12/2013 | Howard et al. | 701/1 |
| 2013/0338877 A1* | 12/2013 | Straus | 701/41 |
| 2014/0058611 A1* | 2/2014 | Borinato | 701/23 |
| 2014/0136414 A1* | 5/2014 | Abhyanker | 705/44 |
| 2014/0160252 A1* | 6/2014 | Randler et al. | 348/47 |
| 2014/0207352 A1* | 7/2014 | Rossi et al. | 701/70 |

* cited by examiner

MONITORING AUTONOMOUS VEHICLE BRAKING

BACKGROUND

A vehicle such as an automobile may be configured for autonomous driving operations. For example, the vehicle may include a central control unit or the like, i.e., the computing device having a processor and a memory, that receives data from various vehicle data collection devices such as sensors and generally also external data sources such as navigation information. The central control unit may then provide instructions to various vehicle components, e.g., actuators and the like that control steering, braking, acceleration, etc., to control vehicle operations without action, or with reduced action, by a human operator.

Autonomous and non-autonomous vehicles may be equipped with monitoring systems to detect faults in various vehicle sub-systems, such as a vehicle braking system. However, a vehicle braking system may be further affected by environmental conditions, which in turn can affect operation of the braking system as well as other vehicle systems, such as steering, powertrain, etc. For example, phenomena such as vehicle loading, a snow-packed road surface, precipitation, terrain, etc. can affect vehicle stopping time and distance. In a non-autonomous vehicle, a driver may compensate for phenomena affecting vehicle braking, and hence vehicle stopping time and distance, sometimes without even being aware that a correction or adjustment is being made to braking functions. Further, an adjustment may vary depending on a direction in which a vehicle is going, e.g., down a hill or up a hill, or the type of roadway surface, e.g., sand, gravel, wet, dry, ice etc. However, mechanisms are lacking for making appropriate compensations to vehicle braking in autonomous vehicles.

DETAILED DESCRIPTION

System Overview

Figure 1:
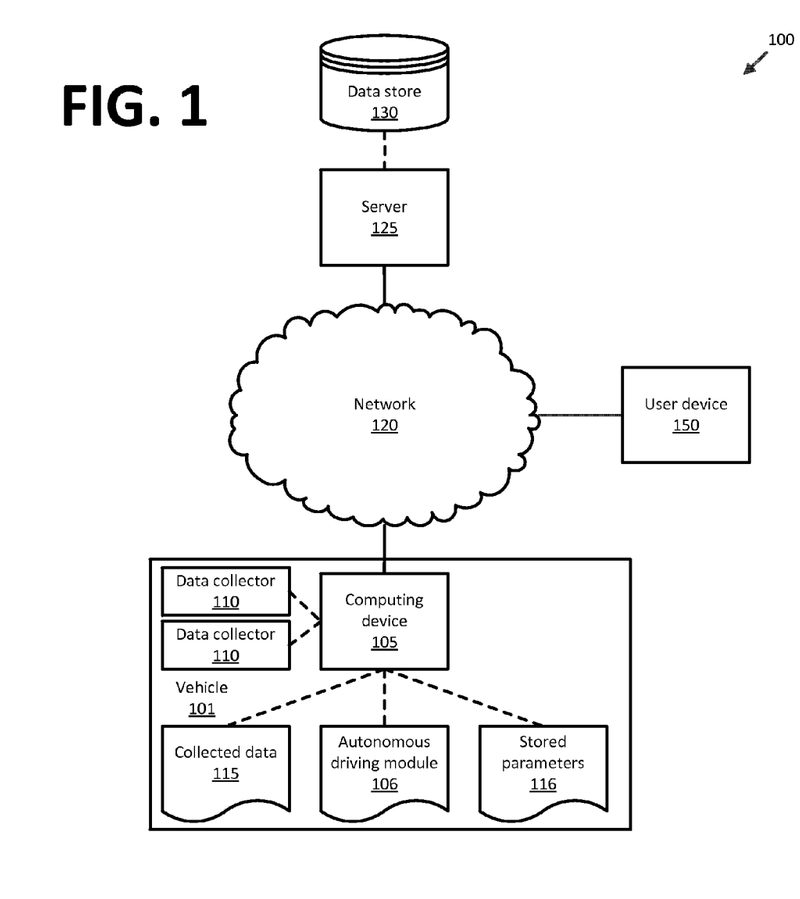
FIG. 1 is a block diagram of an exemplary autonomous vehicle system.

FIG. 1 is a block diagram of an exemplary autonomous vehicle system 100. A computer 105 may be configured for communicating with one or more remote sites such as a server 125 via a network 120, such remote site possibly including a data store 130. A vehicle 101 includes the vehicle computer 105 that is configured to receive information, e.g., collected data 115, from one or more data collectors 110 related to various components or conditions of the vehicle 101, e.g., components such as a steering system, a braking system, a powertrain, etc., and/or conditions such as vehicle 101 speed, acceleration, pitch, yaw, roll, etc. The computer 105 generally includes an autonomous driving module 106 that comprises instructions for autonomously, i.e., without operator input, operating the vehicle 101, including possibly in response to instructions received from a server 125. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

Autonomous braking operations in the vehicle 101 may be governed by one or more stored braking parameters 116. By evaluating collected data 115 with respect to one or more stored parameters 116 being used during autonomous driving operations, the computing device 105 can determine whether to adjust one or more of the parameters 116. For example, the module 106 may change a parameter 116 related to stopping distance and time to stop the vehicle 101 according to one or more environmental conditions or the like, e.g., weather (outside temperature, precipitation, etc.) road surface variations, e.g., smooth or bumpy, etc. that may be detected or inferred by a data collector 110 and/or provided to the computer 105 by the server 125 via the network 120.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, stored parameters 116, the server 125, etc., the module 106 may control various vehicle 101 components and/or operations without a driver to operate the vehicle 101. For example, the module 106 may be used to regulate vehicle 101 speed, acceleration, deceleration, steering, operation of components such as lights, windshield wipers, etc. Further, the module 106 may include instructions for evaluating information received in the computer 105 relating to vehicle 101 operator characteristics, e.g., from an HMI and/or data collectors 110.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure a distance between the vehicle 101 and other vehicles or objects. Yet other sensor data collectors 110 could include cameras, breathalyzers, motion detectors, etc., i.e., data collectors 110 to provide data for evaluating a condition or state of a vehicle 101 operator. In addition, data collectors 110 may include sensors to detect a position, change in position, rate of change in position, etc., of vehicle 101 components such as a steering wheel, brake pedal, accelerator, gearshift lever, etc.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. Accordingly, collected data 115 could include a variety of data related to vehicle 101 operations and/or performance, as well as data related to environmental conditions, road conditions, etc. relating to the vehicle 101. For example, collected data 115 could include data concerning a vehicle 101 speed, acceleration, pitch, yaw, roll, braking, presence or absence of precipitation, tire pressure, tire condition, etc. Collected data 115 could also include data from external sensor data collectors 110 such as radar, camera images, etc. to determine distance between the vehicle 101 and an object that is in its path. Yet further, collected data 115 could include data from the braking system such as braking force and time of apply and from wheel speed sensors and lateral and longitudinal accelerometers for monitoring vehicle motion.

A memory of the computer 105 may further store braking parameters 116. A parameter 116 generally governs control of a vehicle 101 braking system, and is generally associated with an expected performance of a brake application, such as stopping distance and deceleration rate of vehicle 101. These parameters vary due to an environmental condition, road condition, vehicle 101 condition, or the like. For example, a braking parameter 116 may specify an amount of force and rate of application to be applied to a vehicle 101 braking system, e.g., a brake pedal or individual brake calipers, either by default, or according to one or more environmental conditions, road conditions, vehicle 101 conditions, etc., e.g., an intensity or type of precipitation, an unpaved road, worn tires, snow and/or ice conditions, etc. to achieve a desired stopping distance and deceleration rate.

Figure 2:
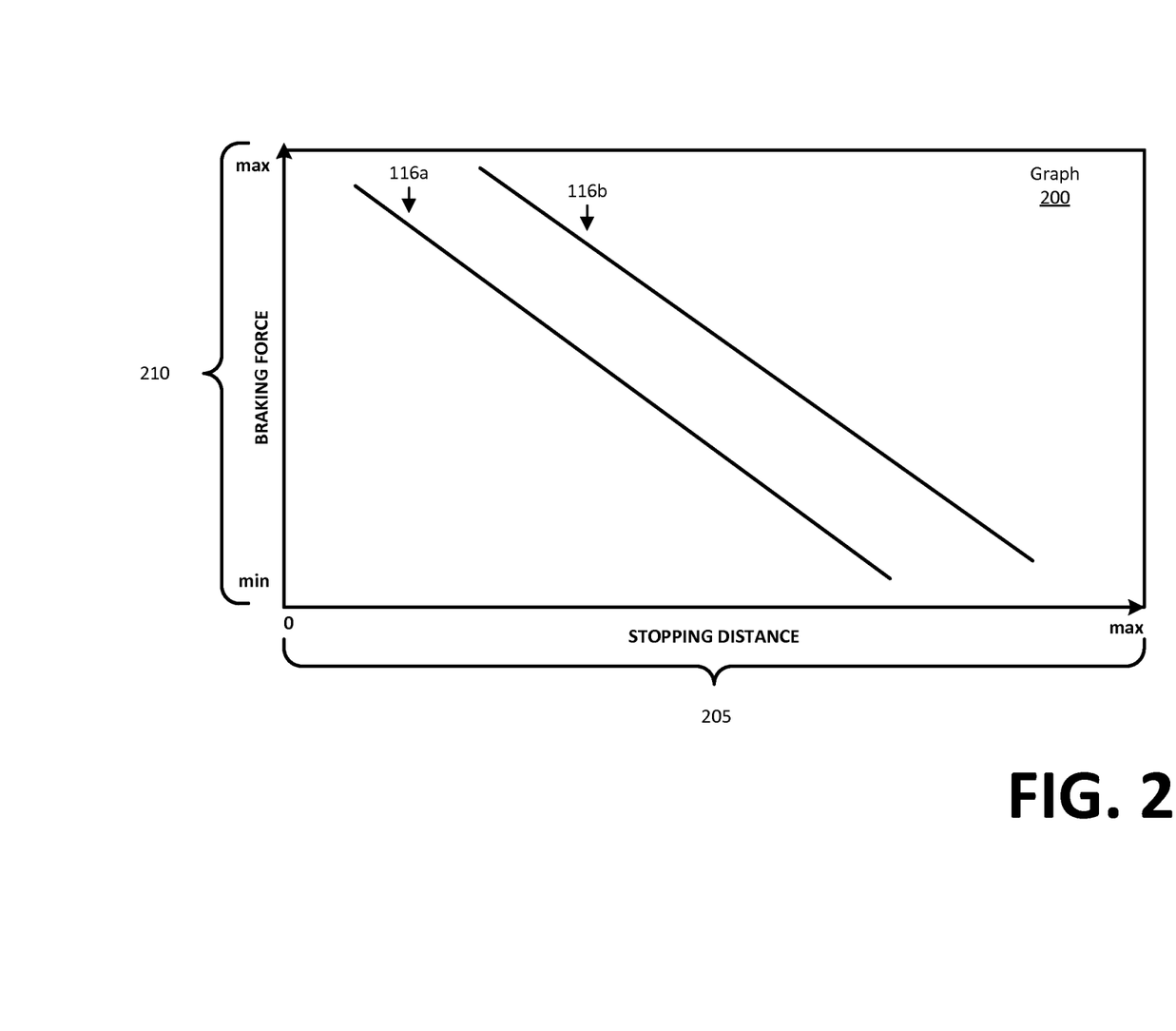
FIG. 2 is a diagram of a graph of braking forces in an exemplary braking system.

FIG. 2 illustrates a graph 200 showing plots of respective sets of braking parameters 116a, 116b, where each of the parameters 116a and 116b pertains an amount of braking assist force to be applied to a braking mechanism, e.g., a brake pedal or individual brake calipers, according to an autonomous driving mechanism such as the module 106, based on different respective environmental conditions and/or vehicle 101 speed or loading. Accordingly, an x-axis 205 of the graph 200 represents stopping distance, i.e., an amount of distance needed by the braking system to stop a vehicle 101, under the environmental condition or conditions and/or vehicle 101 and/or braking force represented by the respective parameters 116a, 116b, when an amount of braking force as represented by a y-axis 210 is applied. Different parameter sets 116 could be generated for different conditions that could be detected or inferred from collected data 115.

For example, with reference to FIG. 2, the lower set of parameters 116a could govern under a "normal" vehicle loading condition, such as where a driver only is present in a vehicle 101, whereas the upper set of parameters 116b could apply under special driving conditions, e.g., four passengers are present in the vehicle and trunk is fully loaded. Additionally or alternatively, the lower set of parameters 116a could govern a lower vehicle 101 speed, whereas the upper, or to the right, parameters 116b could govern a relationship between braking force and stopping distance for a higher vehicle 101 speed.

Returning to FIG. 1, the network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116. For example, collected data 115 relating to road conditions, weather conditions, etc. could be stored in the data store 130, and provided by the server 125 to the computer 105. Likewise, parameters 116 could be provided from the data store 130 via the server 125. For example, parameters 116 could be updated for a particular vehicle 101 or type of vehicle 101, and then the updated parameters 116 could be provided to the module 106.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 and also directly with a vehicle computer 105, e.g., using Bluetooth. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Exemplary Process Flows

Figure 3A:
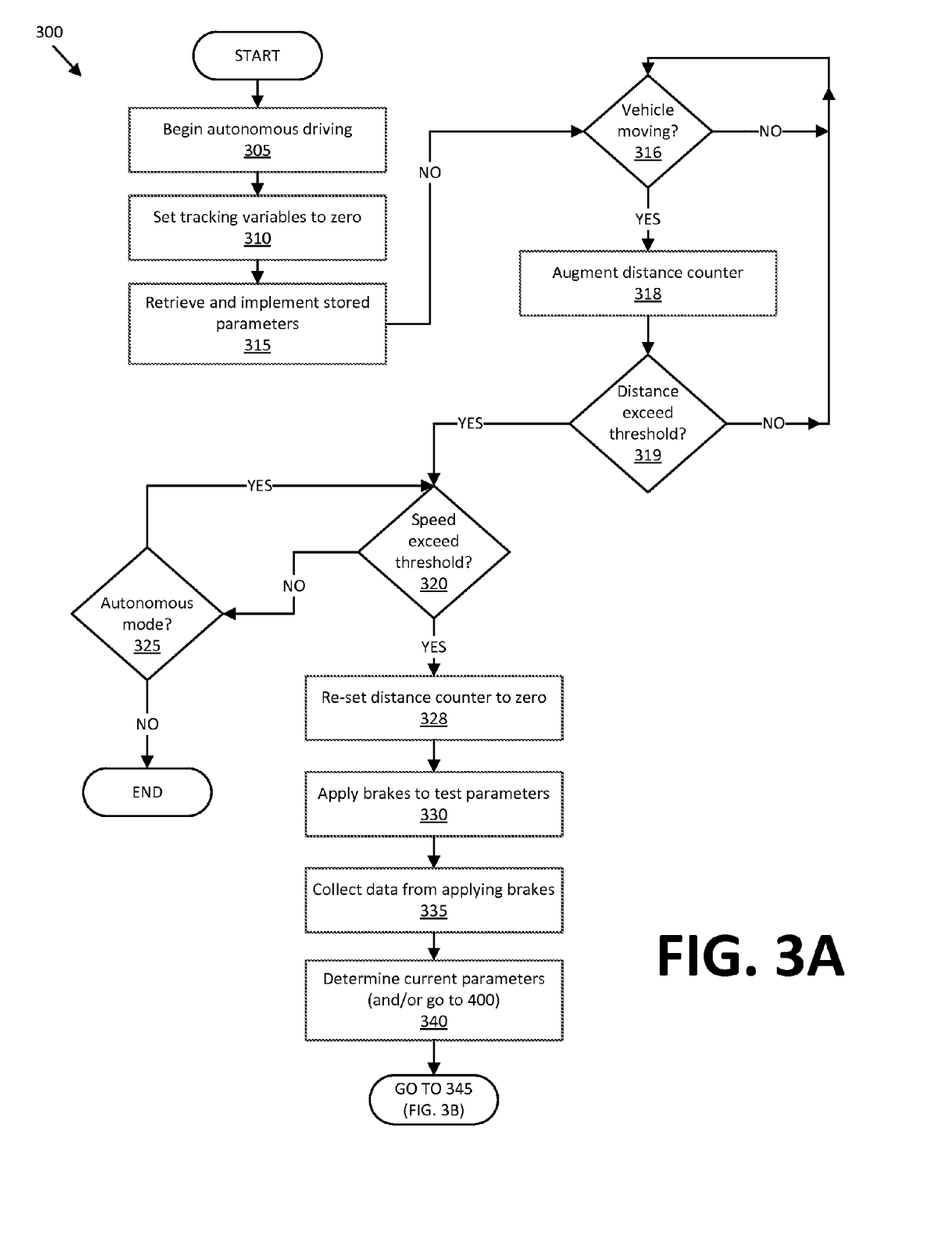
FIGS. 3A and 3B illustrate an exemplary process for monitoring and/or controlling braking in an autonomous vehicle.
Figure 3B:
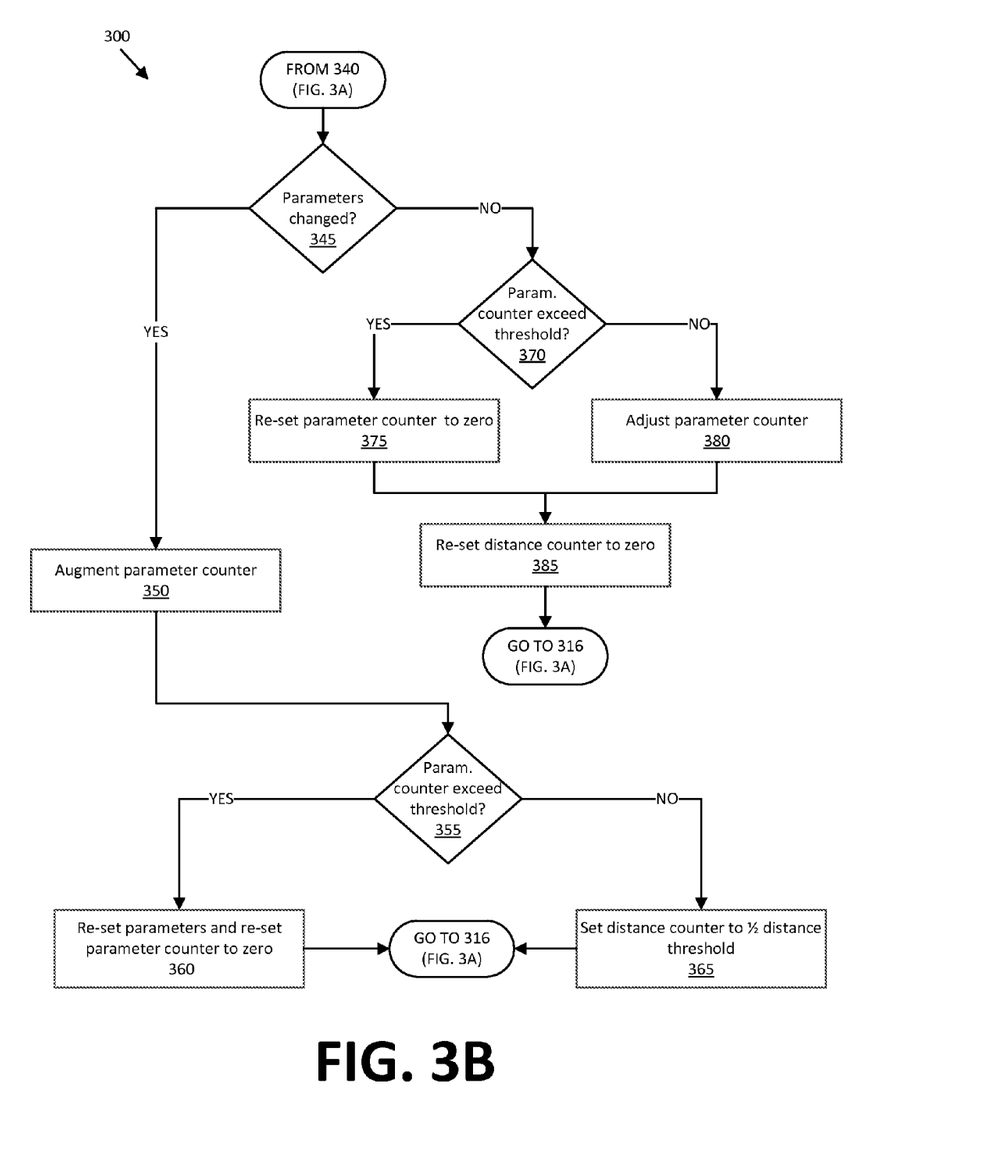

FIGS. 3A and 3B illustrate an exemplary process 300 for monitoring and/or controlling braking in an autonomous vehicle.

As shown in the FIG. 3A, the process 300 begins in a block 305, in which the vehicle 101 commences autonomous driving operations, i.e., begins driving in a manner partially or completely controlled by the autonomous driving module 106. For example, all vehicle 101 operations, e.g., steering, braking, speed, etc., could be controlled by the module 106 in the computer 105. However, it is also possible that, in the block 305, the vehicle 101 may be operated in a partially autonomous (i.e., partially manual, fashion, where some operations, e.g., steering, could be manually controlled by a driver, while other operations, e.g., including braking, could be controlled by the module 106.

Next, the block 310, the computer 105 sets certain tracking, or counter variables, to a value of zero. One of these is generally a parameter re-set tracking variable, sometimes referred to simply as the "parameter counter." The parameter counter is optional, but may be used to determine if an amount of time has elapsed after which changed parameters 116 should be implemented by the module 106, as described further below. Another tracking variable is a "distance traveled" counter, also initially set to zero.

Following the block 310, or substantially contemporaneously with, or even immediately preceding, the blocks 305 and 310, in a block 315 the computer 105 retrieves stored braking parameters 116. As mentioned above, the parameters 116 govern control of a braking mechanism such as a brake pedal, individual brake calipers, etc. The parameters 116 retrieved in the block 315 are generally default parameters for a vehicle 101 type, although the parameters 116 may be further tailored for a particular geographic area, time of year, predicted or detected weather conditions, etc. Moreover, as mentioned above, the parameters 116 could be retrieved from the server 125. In any event, the parameters 116 generally specify, for a given vehicle speed, a braking force to be applied to the brake mechanism and/or a rate at which the brake mechanism should be applied to provide the desired stopping distance and rate of deceleration. The parameters 116 are generally stored in, and retrieved from, a memory or other medium associated with the computer 105, but could also be stored in an retrieved from the server 125.

Also in the block 315, the computer 105 implements the retrieved parameter or parameters 116. That is, during autonomous operations of the vehicle 101, braking is conducted according to these parameters 116. As mentioned above, the vehicle 101 may begin autonomous driving operations using a set of default parameters 116, although the stored parameters 116 may be adjusted for weather conditions, road conditions, etc. that are detected upon beginning autonomous driving. In any event, the object of selecting the default parameters 116 or other parameters 116 that may be used is to provide a safe and comfortable riding experience for occupants of an autonomous vehicle 101.

Next, in a block 316, the computer 105 determined whether the vehicle 101 is moving. For example, the computer 105 may receive data concerning the vehicle 101 speed from a vehicle 101 communication bus. If the speed is zero, or substantially zero, then the process 300 may remain in the block 316. Otherwise, a block 318 is executed next.

In the block 318, the computer 105 augments the distance counter set as described above with respect to the block 310. For example, the computer 105 may receive data concerning a vehicle distance traveled since a time when vehicle 101 movement began as determined in the block 316. Accordingly, the distance counter could be augmented to include a measurement of a distance that the vehicle 101 has traveled since the time when movement was determined to have begun in the block 316.

Next, in a block 319, the computer 105 determines whether the distance counter exceeds a predetermined threshold. For example, a threshold could be specified reflecting a distance that a vehicle 101 may have traveled before it is appropriate to determine whether parameters 116 have changed, and to possibly take action based on such change, as described below. A purpose of using the distance threshold is to trigger a new brake monitoring event after traveling a certain distance, which makes the brake monitoring of this process 300 more robust because one-time events (e.g., encountering a pot hole, oil spill, etc.) will then not unduly influence the evaluation of collected data 115 and generation of parameters 116. The distance threshold could be selected based on various criteria. For example, the distance threshold could be set at two miles for slower vehicle 101 speeds, five miles for moderate or middling vehicle 101 speeds and ten miles for higher speeds. Further, the distance threshold could be influence by road conditions, weather conditions, etc., and could be revised by the server 125 if vehicle 101 provided collected data 115 indicating a change in conditions, e.g., a wet road dried. Further for example, assume that clear weather conditions turned to snow; in his case a distance threshold could be reduced, e.g., to one mile from two miles for slower vehicle speeds, to three miles for middling speeds, and five miles for higher speeds. If the distance threshold is not exceeded, then the process 300 returns to the block 316. Otherwise, a block 320 is executed next.

In the block 320, the computer 105 determines whether vehicle 101 speed exceeds a predetermined threshold. For example, at low speeds it may not be desirable and/or necessary to vary parameters 116 according to conditions, e.g., a stopping distance may not be highly sensitive, or very sensitive at all, to a braking force. Further brake monitoring may be performed above a certain speed of the vehicle 101 to diminish the likelihood that a vehicle operator will notice the monitoring and at the same time be able to introduce variations in vehicle 101 parameters (speed, powertrain parameters, etc.) that will allow for generation of collected data 115 that is useful for determining parameters 116. A speed threshold, in some ways similar to the distance threshold mentioned above, could be established based on vehicle 101 characteristics, road conditions, weather conditions, etc. In any case, if the vehicle 101 speed does not exceed the predetermined threshold, then a block 325 is executed next. Otherwise, the process 300 proceeds to a block 328.

In the block 325, the computer 105 determines whether the vehicle 101 remains in an autonomous mode, e.g., under control according to instructions provided by the module 106. If the vehicle 101 remains in an autonomous mode, then the process 300 returns to the block 320. Otherwise, the process 300 ends. Further, it should be noted that the process 300 may end at any time during execution thereof if an autonomous driving mode is ended.

The block 328 may follow the block 320 as noted above. In the block 328, the computer 105 resets the distance counter mentioned above to zero.

Next, in the block 330, the autonomous module 106 provides instructions to apply a predetermined braking force, and a predetermined rate of application, to the vehicle 101 that is likely not to be noticed by the vehicle 101 passengers. By using a predetermined braking force and rate of application the computer 105 can compare collected data 115 as explained below pertaining to current performance of brakes to a performance expected using the stored braking parameters 116.

Next, in the block 335, the computer 105 performs monitoring of vehicle 101 braking systems. While the block 330 braking force is being applied, the computer 105 monitors data from different sources such as powertrain, vehicle deceleration level, brake system wheel speed sensors, etc., to determine the current braking performance parameters, and receives this data as collected data 115. As mentioned above, collected data 115 may be provided via one or more of a variety of data collection devices 110, and may include data concerning vehicle 101 speed, pitch, longitudinal moment, yaw, roll, environmental conditions, road conditions, etc. Collected data 115 generally also includes a position of a braking mechanism, e.g., a brake pedal, braking force, etc.

Following the block 335, in the block 340, the computer 105 evaluates collected data 115 gathered as described with respect to the block 335. In general, to determine current parameters 116, the computer 105 may consult a table or the like that associates parameters 116 for a vehicle 101 with a vehicle 101 speed, and/or other factors mentioned above, including without limitation environmental conditions, road conditions, etc. In addition, the computer 105 generally identifies braking parameters 116 that have changed from the stored parameters 116 that are being used.

It is possible that, in conjunction with, or in addition to, the monitoring and determination of parameters 116 conducted as described with respect to the blocks 335, 340, the computer 105 may also perform a process of determining whether brakes are wet, coated with moisture, etc., such that a drying operation is desirable. Such a drying operation may be conducted in conjunction with the process 300 as described below with respect to the process 400 of FIG. 4. However, the process 400 may not be performed in the context of the process 300, and could also be performed separately.

Following the block 340, turning to FIG. 3B, in a block 345, the computer 105 determines whether the parameters 116 stored as current parameters 116 are different than previous current parameters 116, e.g., parameters 116 previously established as described above. For example, the computing device 105 may determine whether the new current parameters 116 determined in the block 340 match or are within a specified percentage of previous parameters 116 implemented as described above with respect to the block 315. If the parameters have changed, then a block 350 is executed next. If not, then a block 370 is executed next.

In the block 350, which may follow the block 345, the computer 105 augments the parameter tracking counter described above. For example, the parameter variable may be a simple counter, and the block 350 may include incrementing the counter by the integer 1. However, the tracking variable could alternatively or additionally include tracking some other quantity, such as a passage of time from when the tracking variable was set to zero.

In the block 355, which follows the block 350, the computer 105 determines whether a parameter counter variable exceeds a predetermined threshold. That is, if the parameter counter variable exceeds a predetermined value, e.g., a predetermined amount of time, a predetermined integer value based on a number of observations, etc., then it is likely desirable to implement the recommended parameters determined in the block 340. However, if a specified amount of time or number of observations has not passed, or the parameter counter variable is otherwise determined not to exceed the predetermined threshold, then it may not be appropriate and/or desirable to implement the new current parameters determined in the block 340. Accordingly, if the parameter counter variable exceeds the threshold, then a block 360 may be executed following the block 355. Otherwise, a block 365 may be executed following the block 355.

In the block 360, the computer 105 resets the parameter counter to zero, and resets parameters 116 to the current parameter 116 values determined as described above with respect to the block 340. Generally, when parameters 116 are re-set, they are stored in a persistent memory of the computer 105 for subsequent reuse, i.e., in subsequent driving sessions. Thus, if the vehicle 101 is powered off and later restarted, then the re-set parameters 116 will be used, for example, in the block 315 for a new ignition cycle. Thus, parameters 116 may account for changes in a vehicle 101, e.g., wear of tires and/or other components. Following the block 360, the process 300 returns to the block 316, shown in FIG. 3A.

In the block 365, which may follow the block 355, the computer 105 re-sets the distance counter described above to one half of a predetermined distance threshold, e.g., the threshold mentioned above with respect to block 319. The block 365 could be omitted, and/or the computer 105 could re-set the distance counter in some other way, e.g., to some percentage of the predetermined distance threshold other than one half, e.g., 30 percent, 80 percent, etc.; the object of the block 365 is to take into account the fact that parameters 116 have changed from stored parameters 116, even though the parameters 116 did not exceed a predetermined threshold, and the change does not warrant re-setting the parameters 116, e.g., as described with respect to the block 360. In any event, following the block 365, the process 300 returns to the block 316, shown in FIG. 3A.

In the block 370, which may follow the block 345, the computer 105 determines whether the parameter counter is equal to the minimum value. This counter is decreased each time that, as described with respect to the block 345, the computer 105 does not detect a change. If the threshold is equal to the minimum value, then the block 375 is executed following the block 370. Otherwise, the block 380 is executed next.

In the block 375, the computer 105 re-sets of the parameter counter to zero. Then the process 300 proceeds to the block 385.

In the block 380, the computer 105 adjusts the parameter counter, e.g., decreases it by a value of one, subtracts an amount of elapsed time, etc. Following the block 380, the process 300 proceeds to the block 385.

In the block 385, the computer 105 re-sets the distance counter mentioned above to zero. Then the process 300 proceeds to the block 316, shown in FIG. 3A.

Figure 4:
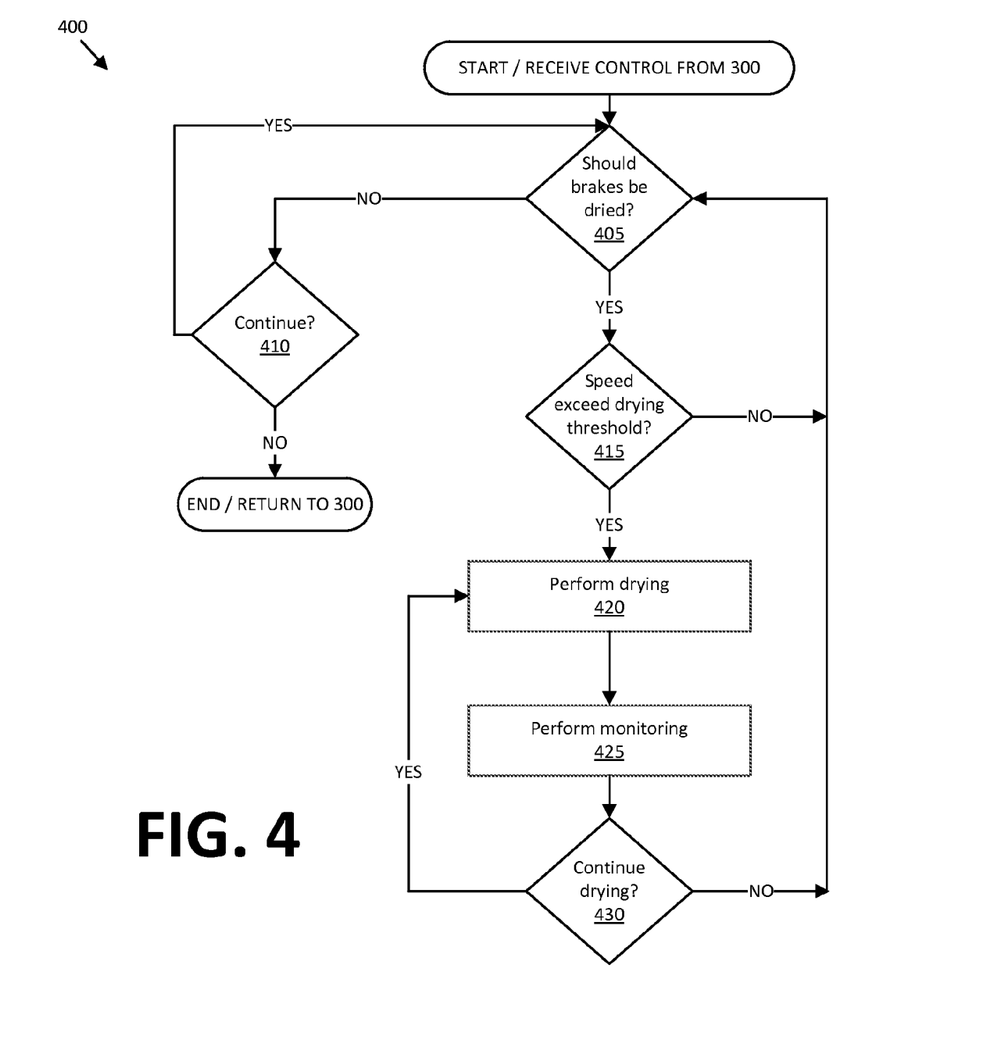
FIG. 4 is a diagram of an exemplary process for monitoring and/or controlling moisture conditions in an autonomous vehicle braking system.

FIG. 4 is a diagram of an exemplary process 400 for monitoring and/or controlling moisture conditions in an autonomous vehicle 101 braking system. As mentioned above, the process 400 may be invoked from within the process 300, e.g., following one of the blocks 335 or 340, or in place of the blocks 335 and/or 340, etc.

The process 400 begins in a block 405, in which the computer 105 determines whether a vehicle 101 braking system, e.g., discs, calipers, etc., should be subjected to a drying operation. This determination may be based on collected data 105 from sensor data collectors 110 configured to detect wetness, moisture, etc. on or near vehicle 101 brakes. For example, such data may be supplied by a windshield rain sensor, or an external viewing sensor that can detect water spray. It may also be collected as part of brake application and monitoring performed as described above with respect to the blocks 330, 335 or below with respect to the block 425. If it is determined that a drying operation should be performed, then a block 415 is executed next. Otherwise, the process 400 proceeds to a block 410.

In the block 410, the computer 105 determines whether the process 400 should continue. For example, the vehicle 101 may be powered off, a user could provide input to terminate the process, etc. In any event, if the computer 105 determines that the process 400 should not continue, and control could return to the process 300 and/or the process 400 could end.

In the block 415, the computer 105 determines whether vehicle 101 speed exceeds a predetermined threshold associated with a need to perform a drying operation. That is, even if sensor data collectors 110 provide collected data 115 indicating that a drying operation should be performed in the block 405, if the vehicle 101 is not moving, or is proceeding relatively slowly, e.g., below 10 miles per hour, a drying operation may not be needed and/or effective. Therefore, if a speed threshold is not met, the process 400 returns to the block 405. Otherwise, the process 400 proceeds to a block 420.

In the block 420, a drying operation is performed. For example, brakes may be slightly applied in a manner that does not substantially affect vehicle 101 driving operations, but that dry the brakes.

Next, in a block 425, the computer 105 performs monitoring, e.g., as described above with respect to the block 335. Alternatively or additionally, the computer 105 may simply monitor collected data 115 relating to whether vehicle 101 brakes are dry or need further drying.

Next, in a block 430, the computer 105 determines whether to continue the drying operation begun in the block 420. The computer 105 may make this determination from collected data 115 monitored as described above with respect to the block 425, or from collected data and/or parameters 116 as described with respect to the blocks 330, 335. If drying should continue, the process 400 returns to the block 420. Otherwise, the process 400 returns to the block 405.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising
a computer that has a processor and a memory, wherein the computer is configured to:
obtain at least one first parameter for governing control of a vehicle braking mechanism;
use the first parameter in providing an instruction to perform a first autonomous actuation the braking mechanism;
collect data relating to operation of the vehicle; and
determine at least one second parameter of the braking mechanism; and
use the second parameter perform a second autonomous actuation the braking mechanism.

2. The system of claim 1, wherein use of the second parameter includes comparing the first and second parameters.

3. The system of claim 1, wherein at least one of the first parameter and the second parameter is a braking assist force to be applied when actuating the braking mechanism.

4. The system of claim 1, wherein the second parameter is determined at least in part according to at least one of a speed of the vehicle and distance threshold.

5. The system of claim 1, the computer being further configured to:
receive information from a remote server relating to an environmental condition; and
use the information from the remote server relating to the environmental condition at least in part in determining the at least one second parameter.

6. The system of claim 1, wherein the collected data includes at least one of a stopping distance of the vehicle and a measurement of moisture on the braking mechanism, and wherein performing a first autonomous actuation of the braking mechanism includes performing a drying operation on the braking mechanism.

7. A method, comprising:
obtaining at least one first parameter for governing control of a vehicle braking mechanism;
using the first parameter in providing an instruction to perform a first autonomous actuation the braking mechanism;
collecting data relating to operation of the vehicle; and determining at least one second parameter of the braking mechanism; and use the second parameter perform a second autonomous actuation the braking mechanism.

8. The method of claim 7, wherein use of the second parameter includes comparing the first and second parameters.

9. The method of claim 7, wherein at least one of the first parameter and the second parameter is a braking assist force to be applied when actuating the braking mechanism.

10. The method of claim 7, further comprising:

receiving information from a remote server relating to an environmental condition; and using the information from the remote server relating to the environmental condition at least in part in determining the at least one second parameter.

11. The method of claim 7, wherein the second parameter is determined at least in part according to at least one of a speed of the vehicle and distance threshold.

12. The method of claim 7, wherein the collected data includes at least one of a stopping distance of the vehicle and a measurement of moisture on the braking mechanism, and wherein performing a first autonomous actuation of the braking mechanism includes performing a drying operation on the braking mechanism.

13. A system, comprising:

a computer in a vehicle, the computer comprising a processor and a memory, wherein the computer is configured to:

provide instructions to a vehicle braking mechanism for autonomous operation of the braking mechanism;

retrieve at least one first parameter for governing control of the braking mechanism;

apply the first parameter to operation of the braking mechanism;

collect data relating to operation of the vehicle;

determine at least one second parameter for governing control of the braking mechanism;

compare the first parameter to the second parameter, and apply the second parameter to operation of the braking mechanism according to the comparison.

14. The system of claim 13, wherein at least one of the first parameter and the second parameter is a braking assist force to be applied to a braking mechanism, and the computer is further configured to cause the braking assist force to be applied to the braking mechanism.

15. The system of claim 13, wherein the second parameter is determined at least in part according to at least one of a speed of the vehicle and distance threshold.

16. The system of claim 13, wherein the collected data includes at least one of a stopping distance of the vehicle and a measurement of moisture on the braking mechanism, the computer being further configured to determine, based on the collected data, to perform a drying operation on the braking mechanism.

17. A system, comprising:

a computer that has a processor and a memory, wherein the computer is configured to:

provide instructions to a vehicle braking mechanism for autonomous operation of the braking mechanism;

retrieve at least one first parameter for governing control of the braking mechanism;

apply the first parameter to operation of the braking mechanism;

collect data relating to operation of the vehicle, wherein the collected data includes at least one of a stopping distance of the vehicle and a measurement of moisture on the braking mechanism;

determine at least one second parameter for governing control of the braking mechanism; and actuate the braking mechanism according to at least the second parameter.

18. The system of claim 17, wherein actuating the braking mechanism includes performing a drying operation on the braking mechanism.

19. The system of claim 17, wherein at least one of the first parameter and the second parameter is a braking assist force to be applied to a braking mechanism, and actating the braking mechanism includes causing the braking assist force to be applied to the braking mechanism.

20. The system of claim 17, wherein the second parameter is determined at least in part according to at least one of a speed of the vehicle and distance threshold.

21. A method, comprising:

providing instructions to a vehicle braking mechanism for autonomous operation of the braking mechanism;

retrieving at least one first parameter for governing control of the braking mechanism;

applying the first parameter to operation of the braking mechanism;

collecting data relating to operation of the vehicle;

determining at least one second parameter for governing control of the braking mechanism;

comparing the first parameter to the second parameter, and applying the second parameter to operation of the braking mechanism according to the comparison.

22. The method of claim 21, wherein at least one of the first parameter and the second parameter is a braking assist force to be applied to a braking mechanism, and the method further comprises causing the braking assist force to be applied to the braking mechanism.

23. The method of claim 21, wherein the second parameter is determined at least in part according to at least one of a speed of the vehicle and distance threshold.

24. The method of claim 21, wherein the collected data includes at least one of a stopping distance of the vehicle and a measurement of moisture on the braking mechanism, and the method further comprises, based on the collected data, performing a drying operation on the braking mechanism.

25. A method, comprising:

providing instructions to a vehicle braking mechanism for autonomous operation of the braking mechanism;

retrieving at least one first parameter for governing control of the braking mechanism;

applying the first parameter to operation of the braking mechanism;

collecting data relating to operation of the vehicle, wherein the collected data includes at least one of a stopping distance of the vehicle and a measurement of moisture on the braking mechanism;

determining at least one second parameter for governing control of the braking mechanism; and actuating the braking mechanism according to at least the second parameter.

26. The method of claim 25, wherein actuating the braking mechanism includes performing a drying operation on the braking mechanism.

27. The method of claim 25, wherein at least one of the first parameter and the second parameter is a braking assist force to be applied to a braking mechanism, and actuating the braking mechanism includes causing the braking assist force to be applied to the braking mechanism.

28. The method of claim 25, wherein the second parameter is determined at least in part according to at least one of a speed of the vehicle and distance threshold.

* * * * *

UNITED STATES PATENT AND TRADEMARK OFFICE
CERTIFICATE OF CORRECTION

| | | |
|---|---|---|
| PATENT NO. | : 9,096,199 B2 | Page 1 of 1 |
| APPLICATION NO. | : 14/049618 | |
| DATED | : August 4, 2015 | |
| INVENTOR(S) | : Wilford Trent Yopp | |

It is certified that error appears in the above-identified patent and that said Letters Patent is hereby corrected as shown below:

Claims
Column 10, line 33, claim 1, insert --of-- after "actuation".
Column 10, line 38, claim 1, insert --to-- after "parameter".
Column 10, line 39, claim 1, insert --of-- after "actuation".
Column 10, line 65, claim 7, insert --of-- after "actuation".
Column 11, line 3, claim 7, insert --to-- after "parameter".
Column 11, line 4, claim 7, insert --of-- after "actuation".

Signed and Sealed this
Eighth Day of March, 2016

Michelle K. Lee
*Director of the United States Patent and Trademark Office*